United States Patent
Kubota et al.

(10) Patent No.: US 11,994,624 B2
(45) Date of Patent: May 28, 2024

(54) PHOTODETECTOR

(71) Applicant: KABUSHIKI KAISHA TOSHIBA, Tokyo (JP)

(72) Inventors: Hiroshi Kubota, Tokyo (JP); Nobu Matsumoto, Ebina Kanagawa (JP); Tomonori Fukushima, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/183,147

(22) Filed: Mar. 13, 2023

(65) Prior Publication Data

US 2023/0228854 A1    Jul. 20, 2023

Related U.S. Application Data

(63) Continuation of application No. 15/448,468, filed on Mar. 2, 2017, now Pat. No. 11,635,497.

(30) Foreign Application Priority Data

Sep. 16, 2016    (JP) .................................. 2016-181776

(51) Int. Cl.
  *G01S 7/4863*    (2020.01)
  *G01S 7/4865*    (2020.01)
  *G01S 17/10*    (2020.01)

(52) U.S. Cl.
  CPC .......... *G01S 7/4863* (2013.01); *G01S 7/4865* (2013.01); *G01S 17/10* (2013.01)

(58) Field of Classification Search
  CPC ....... G01S 7/4863; G01S 7/4865; G01S 17/10
  See application file for complete search history.

(56) References Cited

U.S. PATENT DOCUMENTS 6,657,705 B2    12/2003    Sano et al.
7,858,917 B2    12/2010    Stern et al.
(Continued)

FOREIGN PATENT DOCUMENTS

JP    H10-111365 A    4/1998
JP    2003-4850 A    1/2003
(Continued)

OTHER PUBLICATIONS

Notice of Reasons for Refusal dated Sep. 20, 2019 in corresponding Japanese Patent Application No. 2016-181776 with machine English translation, 8 pages.

(Continued)

*Primary Examiner* — Thanh Luu
(74) *Attorney, Agent, or Firm* — Kim & Stewart LLP

(57) ABSTRACT

A photodetector includes a plurality of cells each configured to detect light and including: a light receiving element configured to output an electrical signal upon receipt of the light, a resistor connected to the light receiving element, and first and second switches connected to the resister. Either the first switch or the second switch is turned on according to a selection signal. The photodetector further includes a first output terminal connected to the first switch of each of the cells and through which a first output signal is output based on the electrical signal that has been output from the first switch, and a second output terminal connected to the second switch of each of the cells and through which a second output signal is output based on the electrical signal that has been output from the second switch.

11 Claims, 19 Drawing Sheets

(56) References Cited

U.S. PATENT DOCUMENTS

| | | | |
|---|---|---|---|
| 8,390,793 | B2 | 3/2013 | Yamaguchi et al. |
| 8,879,686 | B2 | 11/2014 | Okada et al. |
| 9,109,953 | B2 | 8/2015 | Sasaki et al. |
| 2002/0196424 | A1 | 12/2002 | Sano et al. |
| 2006/0289726 | A1* | 12/2006 | Paulus ............... G01N 27/3275 250/221 |
| 2007/0182949 | A1 | 8/2007 | Niclass |
| 2008/0055434 | A1 | 3/2008 | Ovsiannikov |
| 2009/0185159 | A1 | 7/2009 | Rohner et al. |
| 2009/0303342 | A1 | 12/2009 | Corcoran et al. |
| 2009/0315135 | A1* | 12/2009 | Finkelstein ............ H01L 31/107 257/E31.113 |
| 2012/0261729 | A1 | 10/2012 | Finkelstein et al. |
| 2013/0300838 | A1 | 11/2013 | Borowski |
| 2014/0097329 | A1* | 4/2014 | Wadsworth ............... G01J 1/44 250/208.1 |
| 2014/0168632 | A1 | 6/2014 | Eisele et al. |
| 2014/0367576 | A1 | 12/2014 | Sasaki et al. |
| 2015/0041625 | A1 | 2/2015 | Dutton et al. |
| 2018/0209846 | A1 | 7/2018 | Vandai et al. |
| 2019/0259899 | A1 | 8/2019 | Matsubara et al. |

FOREIGN PATENT DOCUMENTS

| | | |
|---|---|---|
| JP | 2011-163901 A | 8/2011 |
| JP | 2013150304 A | 8/2013 |
| JP | 2014241543 A | 12/2014 |
| JP | 2015-078953 A | 4/2015 |
| JP | 2015078953 A | 4/2015 |
| JP | 2015117970 A | 6/2015 |

OTHER PUBLICATIONS

Notice of Reasons for Refusal dated Mar. 27, 2020 in corresponding Japanese Patent Application No. 2016-181776 with machine English translation, 6 pages.

Cristiano Niclass et al., "A 0.18μm CMOS SoC for a 100m-range 10fps 200×96-pixel time-of-flight depth sensor", IEEE International Solid-State Circuits Conference, Feb. 2013, 3 pages.

* cited by examiner

FIG. 9

| x ↓ / y → | 0 | 2 | 3 | 4 | 5 | 6 | 7 | 8 |
|---|---|---|---|---|---|---|---|---|
| 0 | | 4 | 9 | 16 | 25 | 36 | 49 | 64 |
| 0.02 | | 3.92 | 8.538462 | 14.66667 | 22.14286 | 30.82759 | 40.6 | 51.35484 |
| 0.04 | | 3.84 | 8.111111 | 13.51724 | 19.83871 | 26.90909 | 34.6 | 42.81081 |
| 0.06 | | 3.76 | 7.714286 | 12.51613 | 17.94118 | 23.83784 | 30.1 | 36.65116 |
| 0.08 | | 3.68 | 7.344828 | 11.63636 | 16.35135 | 21.36585 | 26.6 | 32 |
| 0.1 | | 3.6 | 7 | 10.85714 | 15 | 19.33333 | 23.8 | 28.36364 |
| 0.12 | | 3.52 | 6.677419 | 10.16216 | 13.83721 | 17.63265 | 21.50909 | 25.44262 |
| 0.14 | | 3.44 | 6.375 | 9.538462 | 12.82609 | 16.18868 | 19.6 | 23.04478 |
| 0.16 | | 3.36 | 6.090909 | 8.97561 | 11.93878 | 14.94737 | 17.98462 | 21.0411 |
| 0.18 | | 3.28 | 5.823529 | 8.465116 | 11.15385 | 13.86885 | 16.6 | 19.34177 |
| 0.2 | | 3.2 | 5.571429 | 8 | 10.45455 | 12.92308 | 15.4 | 17.88235 |
| 0.22 | | 3.12 | 5.333333 | 7.574468 | 9.827586 | 12.08696 | 14.35 | 16.61538 |
| 0.24 | | 3.04 | 5.108108 | 7.183673 | 9.262295 | 11.34247 | 13.42353 | 15.50515 |
| 0.26 | | 2.96 | 4.894737 | 6.823529 | 8.75 | 10.67532 | 12.6 | 14.52427 |
| 0.28 | | 2.88 | 4.692308 | 6.490566 | 8.283582 | 10.07407 | 11.86316 | 13.65138 |
| 0.3 | | 2.8 | 4.5 | 6.181818 | 7.857143 | 9.529412 | 11.2 | 12.86957 |
| 0.32 | | 2.72 | 4.317073 | 5.894737 | 7.465753 | 9.033708 | 10.6 | 12.16529 |
| 0.34 | | 2.64 | 4.142857 | 5.627119 | 7.105263 | 8.580645 | 10.05455 | 11.52756 |
| 0.36 | | 2.56 | 3.976744 | 5.377049 | 6.772152 | 8.164948 | 9.556522 | 10.94737 |
| 0.38 | | 2.48 | 3.818182 | 5.142857 | 6.463415 | 7.782178 | 9.1 | 10.41727 |
| 0.4 | | 2.4 | 3.666667 | 4.923077 | 6.176471 | 7.428571 | 8.68 | 9.931034 |
| 0.42 | | 2.32 | 3.521739 | 4.716418 | 5.909091 | 7.100917 | 8.292308 | 9.483444 |
| 0.44 | | 2.24 | 3.382979 | 4.521739 | 5.659341 | 6.79646 | 7.933333 | 9.070064 |
| 0.46 | | 2.16 | 3.25 | 4.338028 | 5.425532 | 6.512821 | 7.6 | 8.687117 |
| 0.48 | | 2.08 | 3.122449 | 4.164384 | 5.206186 | 6.247934 | 7.289655 | 8.331361 |
| 0.5 | | 2 | 3 | 4 | 5 | 6 | 7 | 8 |

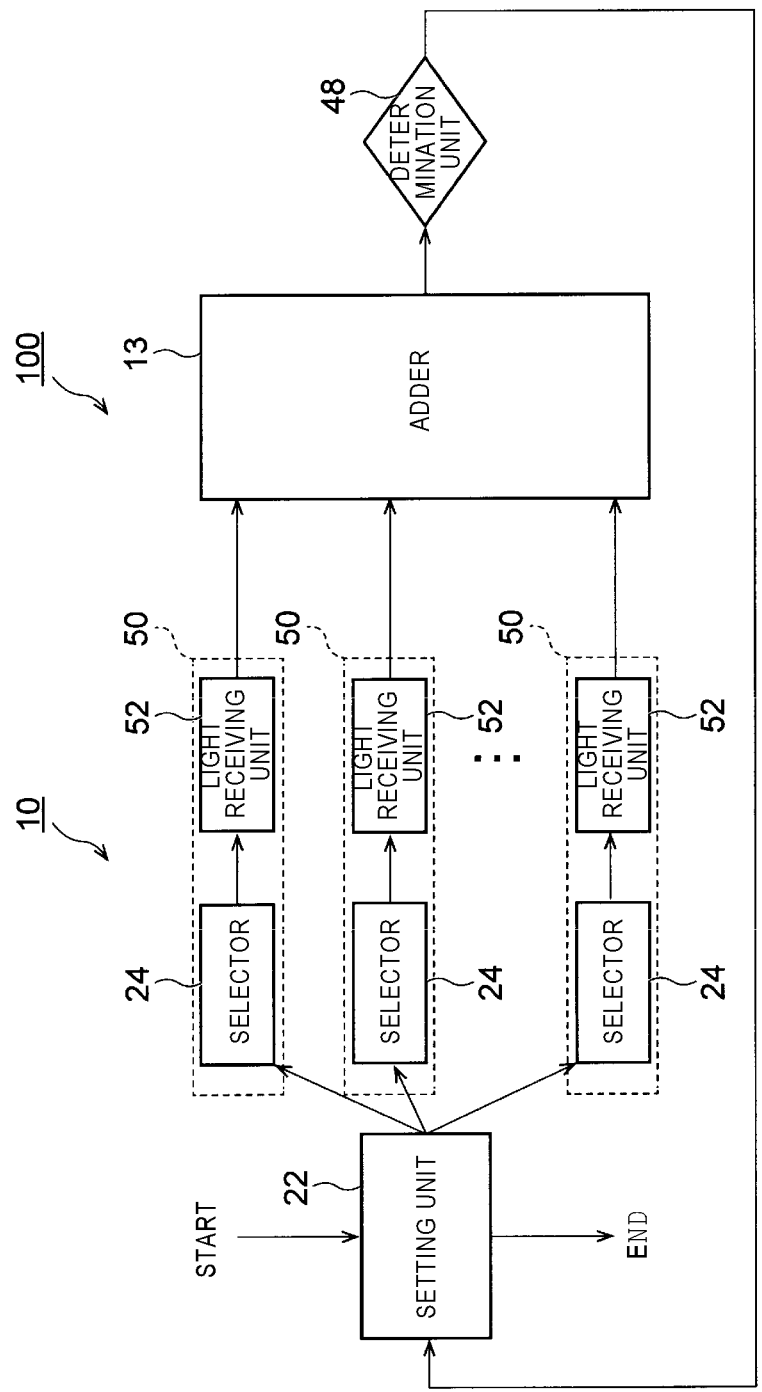

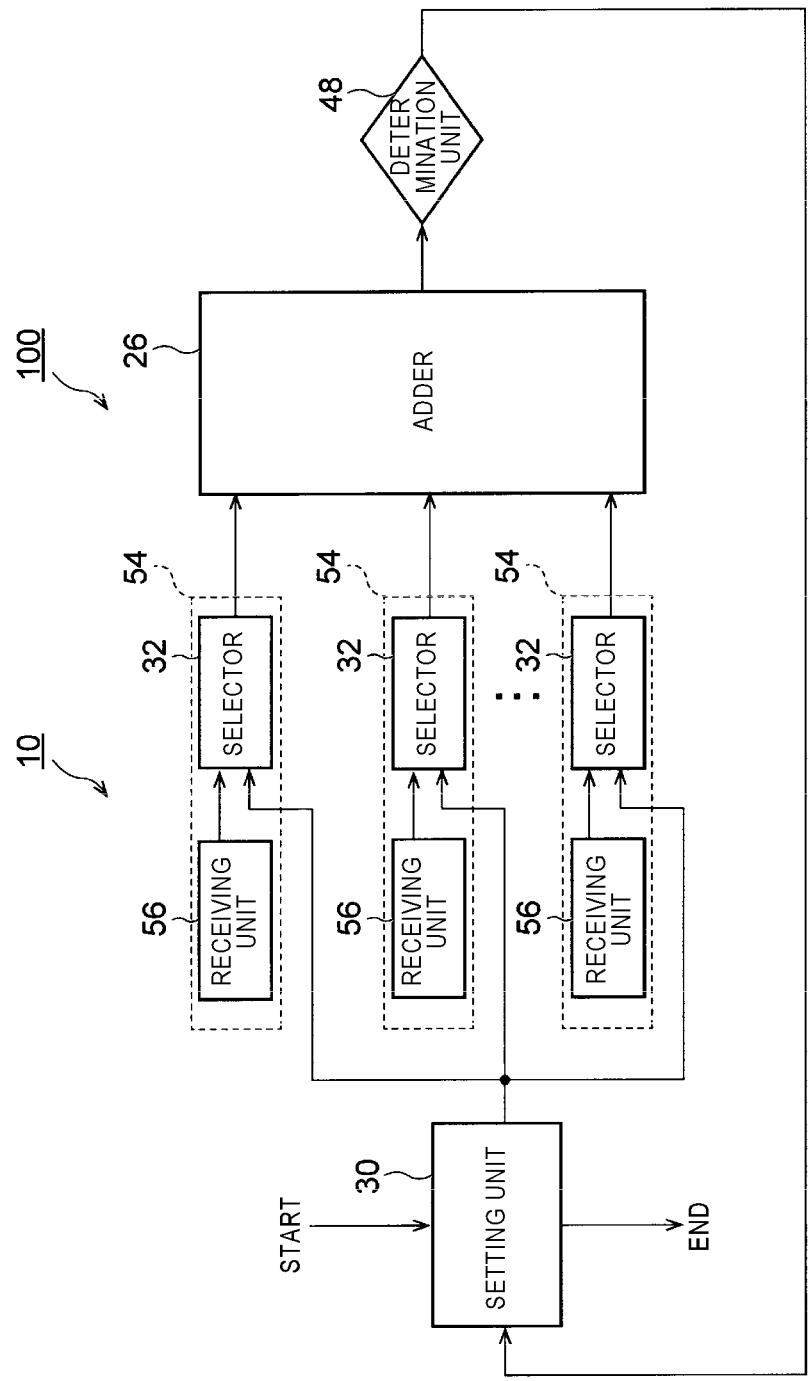

PHOTODETECTOR

CROSS-REFERENCE TO RELATED APPLICATION

This application is a continuation of U.S. patent application Ser. No. 15/448,468, filed Mar. 2, 2017, which is based upon and claims the benefit of priority from Japanese Patent Application No. 2016-181776, filed Sep. 16, 2016, the entire contents of which are incorporated herein by reference.

FIELD

Embodiments described herein relate generally to a photodetector.

BACKGROUND

A distance measuring device of one type includes a light source that irradiates measurement light to a measurement target object and a photodetector to detect the measurement light reflected by the measurement target object. Since weak laser light is typically used as the measurement light, the reflected measurement light is detected as a photon.

However, when the distance measuring device is used outdoors, ambient light also enters a light receiving region of the photodetector, which results in increased noise. For that reason, optical adjustment is performed so that the light receiving region exactly matches an incidence region of the measurement light. However, the optical adjustment requires repeated mechanical fine adjustments and thus may take a significant amount of time.

DESCRIPTION OF THE DRAWINGS

FIG. 9 illustrates an aspect ratio table of rectangular cells.

FIG. 13 illustrates a configuration of a distance measuring device when analog addition is performed.

FIG. 14 illustrates a configuration of a distance measuring device when digital addition is performed.

DETAILED DESCRIPTION

An embodiment of the present invention provides a photodetector capable of changing a light receiving region to be used for measurement of measurement light.

In general, according to an embodiment, a photodetector includes a plurality of cells each configured to detect light and including: a light receiving element configured to output an electrical signal upon receipt of the light, a resistor connected to the light receiving element, and first and second switches connected to the resister. Either the first switch or the second switch is turned on according to a selection signal. The photodetector further includes a first output terminal connected to the first switch of each of the cells and through which a first output signal is output based on the electrical signal that has been output from the first switch, and a second output terminal connected to the second switch of each of the cells and through which a second output signal is output based on the electrical signal that has been output from the second switch.

Hereinafter, embodiments of the present invention will be described with reference to the drawings. However, these embodiments do not limit the present invention.

First Embodiment

A photodetector according to a first embodiment causes a light receiving region used for measurement to coincide with an incidence region of measurement light reflected from a measurement target object by selecting a light receiving element that receives preliminarily measurement light irradiated from a plurality of light receiving elements arranged in parallel. The photodetector will be described in more detail.

Figure 1A:
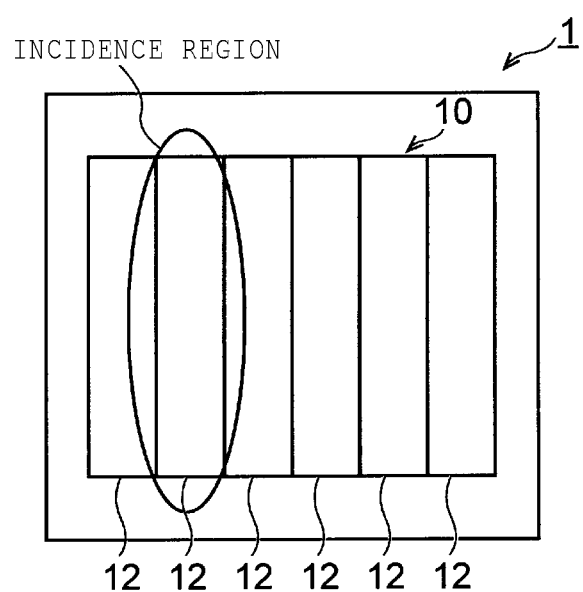
FIG. 1A illustrates rectangular cells and FIG. 1B illustrates square cells.
Figure 1B:
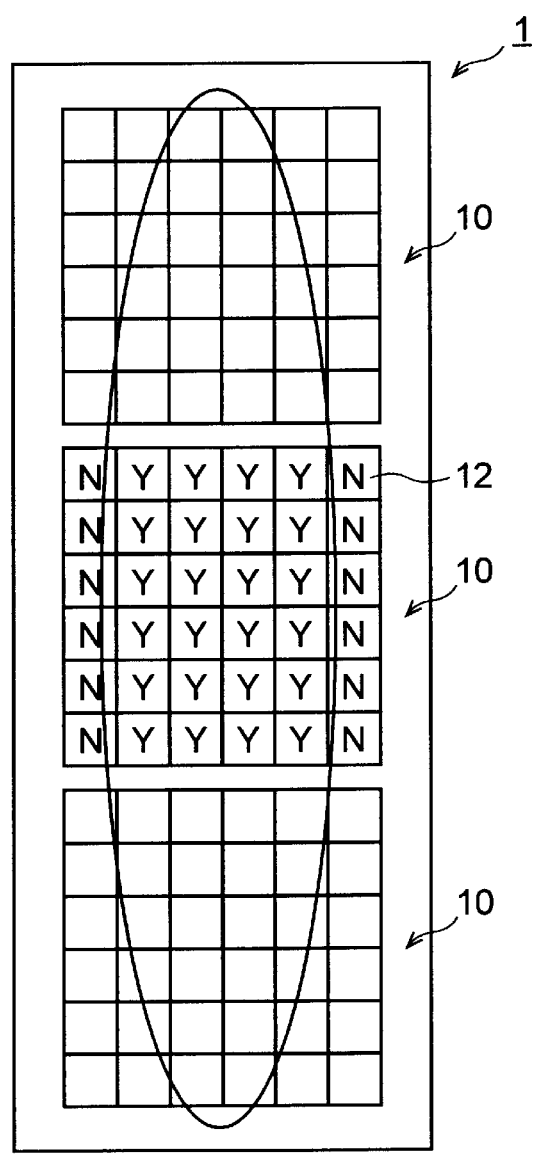

Selection of a cell 12 used for measurement will be described with reference to FIG. 1. FIGS. 1A and 1B illustrate a configuration example of pixels 10 included in a photodetector 1 according to the first embodiment. FIG. 1A illustrates rectangular cells and FIG. 1B illustrates square cells. The photodetector 1 detects measurement light reflected by a measurement target object in a light receiving region via an optical system. The photodetector 1 is used in combination of a projector that projects measurement light. This measurement light is weak laser light. The photodetector 1 has a vertically long shape having a width of 100 μm to 1 mm, for example.

A round trip time of light increases as the distance from the photodetector 1 to the measurement target object increases. Due to this, the distance can be measured using a time difference between the timing at which the projector irradiates light and the timing at which the reflected measurement light is detected by the photodetector 1.

The pixel 10 detects the measurement light reflected from the measurement target object. This pixel 10 includes a plurality of cells 12. The cell 12 is a basic unit of the pixel 10. A light receiving region of each cell 12 is a rectangular region illustrated in FIG. 1A. Alternatively, the light receiving region may be a square region illustrated in FIG. 1B. The width of the cell 12 is approximately 10 μm to 30 μm. In this manner, these cells 12 are arranged in parallel. Moreover, each cell 12 outputs an electrical signal according to a photon that collides with the light receiving region.

In the photodetector 1, the measurement light irradiated by the projector is adjusted before the measurement light is measured. This adjustment is performed by preliminarily irradiating measurement light to a reference target object disposed at a predetermined distance from the photodetector 1 in a darkroom, for example. A region indicated by an ellipse in FIGS. 1A and 1B is the incidence region of the measurement light irradiated preliminarily. The incidence region of the measurement light incident via the optical system is fixed unless the optical system moves.

On the other hand, ambient light enters the photodetector 1 from much wider directions. For that reason, the ambient light may enter the light receiving regions of all cells 12.

To accurately detect the measurement light, the photodetector 1 selects one or more cells 12 having a light receiving region that overlaps the incidence region illustrated in FIGS. 1A and 1B. That is, the photodetector 1 selects one or more cells 12 that have detected the measurement light reflected from the reference target object as a cell 12 to be used for measurement. In FIG. 1A, the second cell 12 from the left end is selected. In this way, the ambient light becomes less likely to be detected as a signal decreases. As illustrated in FIG. 1B, a plurality of cells 12 may be selected. Here, cells indicated by "Y" are selected in the pixel 10 at the center. Alternatively, a single cell 12 may be selected.

Figure 2:
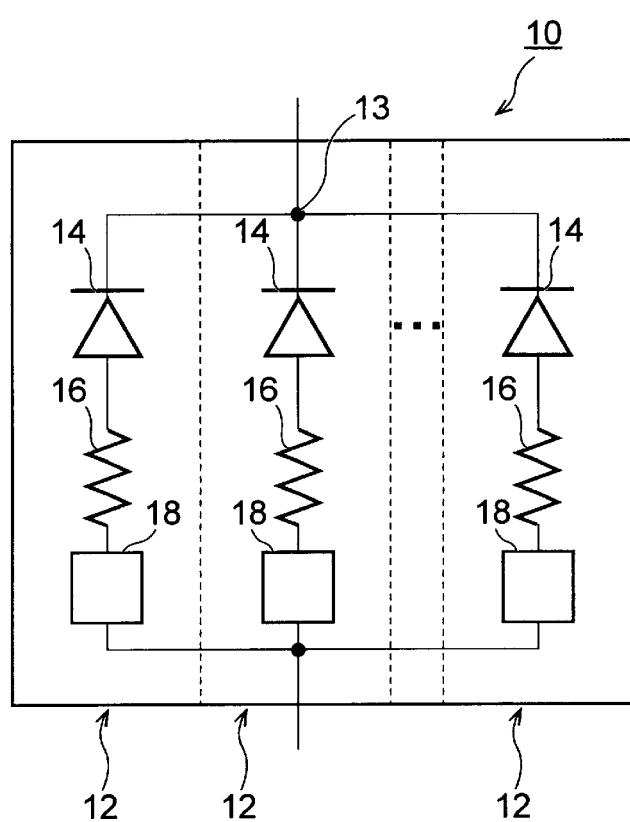
FIG. 2 illustrates a configuration of a pixel in which currents are analog-added.

Next, a configuration example of the cell 12 included in the pixel 10 according to the first embodiment will be described with reference to FIG. 2. FIG. 2 illustrates a configuration of the pixel 10 in which currents are analog-added. This pixel 10 has a plurality of cells 12 having different light receiving regions. The cell 12 includes a light receiving element 14, a resistor 16, and a selector 18. A plurality of these cells 12 are connected in parallel.

The light receiving element 14 outputs an electrical signal according to a photon that collides with a light receiving region. This electrical signal is current, for example. The light receiving element 14 is a photodiode, for example. The photodiode used in the present embodiment is an avalanche photodiode (APD, hereinafter sometimes referred to as APD 14).

The APD 14 is a light receiving element that increases light receiving sensitivity using a phenomenon called avalanche multiplication. In this example, the APD 14 is used in a Geiger mode. The Geiger mode is a mode in which a voltage applied to the APD 14 is set to a breakdown voltage and a large gain exceeding 10,000 is obtained by Geiger discharge. Moreover, in the Geiger mode, constant Geiger discharge occurs when a photon enters the APD 14.

The APD 14 used in the Geiger mode is generally referred to as a single-photon avalanche diode (hereinafter referred to as SPAD) and has sensitivity to light having a wavelength of 200 nm to 1200 nm, for example. That is, the APD 14 has sensitivity to light from visible light to near-infrared light.

The resistor 16 is connected in series to the APD 14. This resistor 16 is a quench resistor, for example, and stops the Geiger discharge of the APD 14. That is, when current flow into the resistor 16 during Geiger discharge, the voltage applied to the APD 14 decreases to be equal to or lower than a dielectric breakdown voltage. As a result, the Geiger discharge of the APD 14 stops. The APD 14 in which Geiger discharge stops operates in the Geiger mode again after the elapse of a dead time (generally, approximately several ns to 100 ns).

The selector 18 selects a cell 12 to be used for measurement. The selector 18 is a gate transistor, for example. A detailed configuration of the selector 18 will be described with reference to FIGS. 3 to 6. The selector 18 may be disposed outside the cells 12 so that the selector 18 selects a cell to be used for measurement from a plurality of cells 12.

An adder 13 is a connection portion to which the plurality of cells 12 is connected. This adder 13 analog-adds electrical signals output by the cell 12 selected by the selector 18. As can be understood, when a photon simultaneously enters the plurality of light receiving elements 14 selected by the selector 18, the electrical signals output by the plurality of light receiving elements 14 are analog-added by the adder 13 and the added electrical signals are output from the pixel 10. By measuring the analog added electrical signals, it is possible to detect the number of photons entering the light receiving region of the pixel 10 (that is, the light receiving region of the photodetector 1).

The photodetector 1 may be configured as a plurality of pixels 10 as illustrated in FIG. 1B. Alternatively, the photodetector 1 may be configured as a single pixel 10 as illustrated in FIG. 1A.

Figure 3:
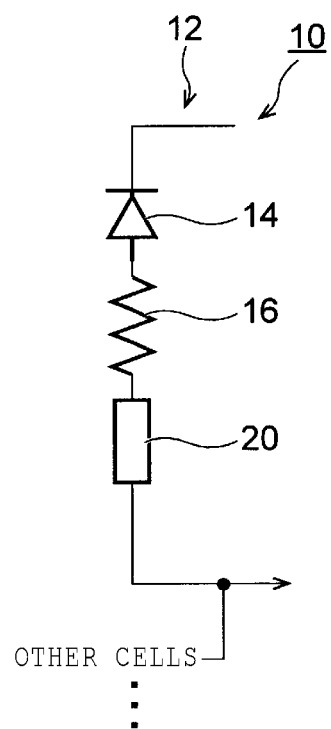
FIG. 3 illustrates an example in which a fuse is used as a selector.

Next, a configuration example of a selector that selects the light receiving element 14 will be described with reference to FIGS. 3 to 6. First, a configuration example in which the light receiving element 14 is selected by fusing the selector 20 will be described with reference to FIG. 3. FIG. 3 illustrates a configuration in which a fuse is used as the selector 20. The same elements as those of FIG. 2 will be denoted by the same reference numerals and the description thereof will not be provided.

Each cell 12 included in a pixel 10 includes a light receiving element 14, a resistor 16, and a selector 20. The selector 20 is connected in series to the light receiving element 14. The selector 20 fuses when heated. This selector 20 is a fuse, for example.

No voltage is applied to the light receiving element 14 connected to the fused selector 20 and the light receiving element 14 does not output an electrical signal. In this manner, by fusing the selector 20 of the light receiving element 14 which is not used, the light receiving element 14 used for detecting light is selected. In this case, the light receiving element 14 can be selected during the first adjustment only.

Figure 4:
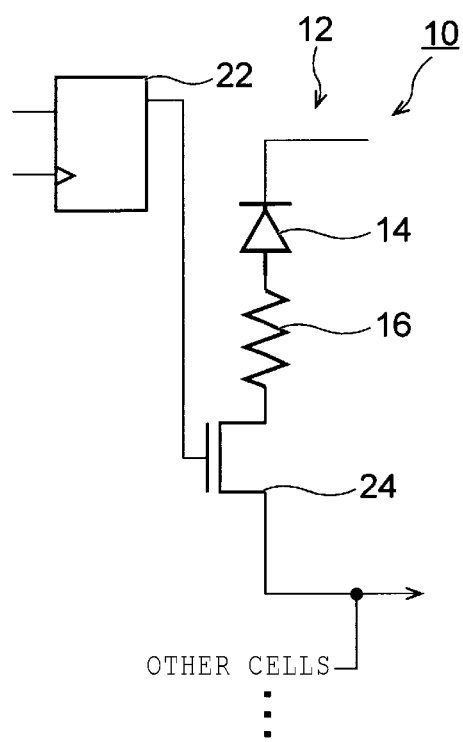
FIG. 4 illustrates an example in which a gate transistor is used as a selector.

Next, a configuration in which the light receiving element 14 to be used for outputting a signal to the pixel 10 is electrically selected will be described with reference to FIG. 4. FIG. 4 illustrates a configuration in which a gate transistor is used as the selector 24. The same elements as those of FIG. 2 will be denoted by the same reference numerals and the description thereof will not be provided.

A cell 12 included in a pixel 10 includes a light receiving element 14, a resistor 16, a setting unit 22, and a selector 24. The setting unit 22 is connected to the selector 24. The setting unit 22 is a register, for example, and outputs a selection signal indicating selection to the selector 24 based on an input signal. Moreover, the setting unit 22 can retain an input signal and continuously outputs a selection signal when retaining the input signal.

The selector 24 is a gate transistor, for example, and is connected in series to the light receiving element 14. The selector 24 is connected to the setting unit 22 and causes the light receiving element 14 into a conduction state according to a selection signal from the setting unit 22. On the other hand, the selector 24 to which the selection signal is not input is in a cut-off state. In this way, it is possible to select the light receiving element 14 to be used for outputting a signal to the pixel 10.

As can be understood, the pixel 10 illustrated in FIG. 4 can electrically select the light receiving element 14 to be used for outputting a signal to the pixel 10. That is, when the input signal is retained by the setting unit 22, the conduction state of the selector 24 to be used for outputting a signal to the pixel 10 is maintained. On the other hand, when the input signal is not retained in the setting unit 22, the selector 24 maintains the cut-off state. In this way, it is possible to dynamically select the light receiving element 14 to be used for outputting a signal to the pixel 10.

Figure 5:
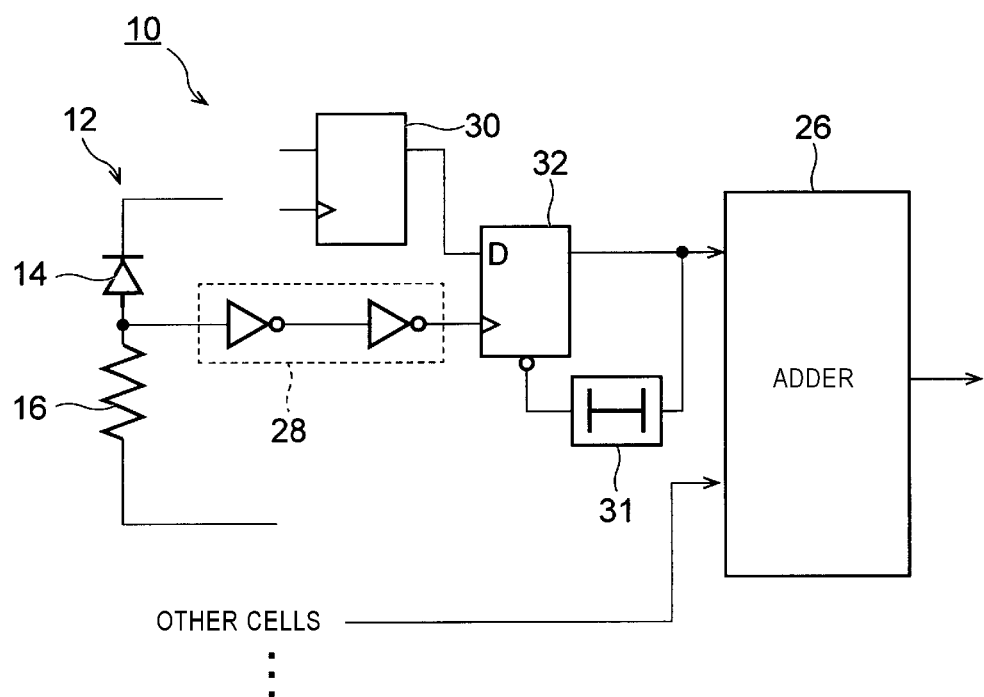
FIG. 5 illustrates a configuration in which a light receiving element is selected by a D flip-flop.

Next, an example in which the light receiving element 14 is selected using a logical circuit will be described with reference to FIG. 5. FIG. 5 illustrates an example of a configuration in which the light receiving element 14 is selected using a D flip-flop. The same elements as those of FIG. 2 will be denoted by the same reference numerals and the description thereof will not be provided.

A pixel 10 includes a plurality of cells 12 and an adder 26. The adder 26 adds digital signals input thereto. The cell 12 includes a light receiving element 14, a resistor 16, a buffer 28, a setting unit 30, a delay element 31, and a selector 32. The buffer 28 includes two inverters connected in series. One end of the buffer 28 is connected between the light receiving element 14 and the resistor 16, and the other end is connected to the selector 32.

The setting unit 30 is connected to the selector 32. The setting unit 30 is a register, for example, and outputs a logical value indicating selection to the connected selector 32 based on an input signal. Moreover, the setting unit 30 can retain the input signal. In this case, the setting unit 30 can continuously output the logical value indicating selection.

The selector 32 is connected to the adder 26, the buffer 28, the setting unit 30, and the delay element 31. The selector 32 is a D flip-flop, for example, and outputs a digital signal input from the buffer 28 to the adder 26 when the logical value indicating selection is input from the setting unit 30.

As can be understood, when the logical value indicating selection is input from the setting unit 30 to the selector 32, the digital signal is added by the adder 26. In this manner, when the input signal is retained in the setting unit 30, the output state of the digital signal from the buffer 28 to the adder 26 is maintained for a delay period of the delay element 31. On the other hand, when the input signal is not retained in the setting unit 30, the digital signal output from the buffer 28 is not output to the adder 26. In this way, it is possible to dynamically select the light receiving element 14 to be used for outputting a signal to the pixel 10.

Figure 6:
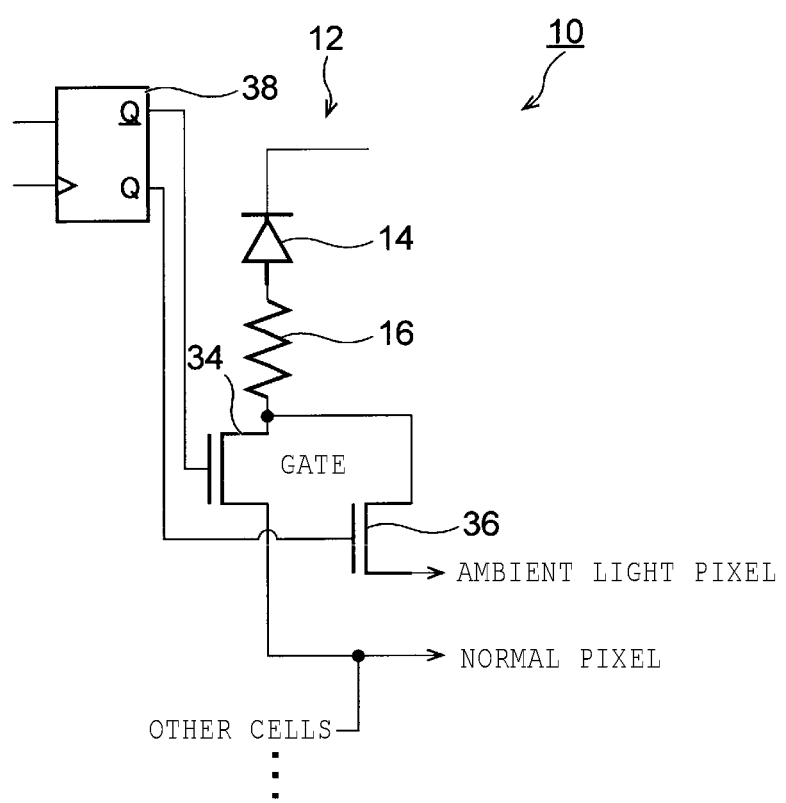
FIG. 6 illustrates a configuration of a pixel capable of measuring ambient light.

Next, a configuration of the pixel 10 capable of measuring ambient light will be described with reference to FIG. 6. FIG. 6 illustrates a configuration of the pixel 10 capable of measuring ambient light. Here, the ambient light means light other than measurement light. For example, measurement is performed in the daytime and the ambient light is mainly sunlight. That is, the pixel 10 illustrated in FIG. 6 includes a light receiving element 14, a resistor 16, a first selector 34, a second selector 36, and a setting unit 38. The same elements as those of FIG. 2 will be denoted by the same reference numerals and the description thereof will not be provided.

The first selector 34 is connected in series between the resistor 16 and an adder of a general pixel. Moreover, the first selector 34 is a gate transistor, for example, and is connected to the setting unit 38 to cause the light receiving element 14 into a conduction state according to a selection signal from the setting unit 38. On the other hand, the selector 34 to which the selection signal is not input is in a cut-off state. In this way, it is possible to select the light receiving element 14 to be used for outputting a signal to a general pixel.

The second selector 36 is connected in series between the resistor 16 and an adder of an ambient light pixel. Moreover, the second selector 36 is a gate transistor, for example, and is connected to the setting unit 38 to cause the light receiving element 14 into a conduction state according to a selection signal from the setting unit 38. On the other hand, the second selector 36 to which the selection signal is not input is in a cut-off state. In this way, it is possible to select the light receiving element 14 to be used for outputting a signal to the ambient light pixel.

The setting unit 38 is a register, for example, and is connected to the first selector 34 and the second selector 36. The setting unit 38 outputs a selection signal indicating selection to the first selector 34 based on an input signal. On the other hand, the signal output to the first selector 34 is inverted and output to the second selector 36. That is, when the input signal is not retained in the setting unit 38, the selection signal indicating selection is output to the second selector 36.

As can be understood, the setting unit 38 causes the second selector 36 to enter into a cut-off state when putting the first selector 34 into a conduction state. Conversely, the setting unit 38 causes the second selector 36 to enter into a conduction state when putting the first selector 34 into a cut-off state.

As described above, in the pixel 10 illustrated in FIG. 6, when the input signal is retained in the setting unit 38, the output of the light receiving element 14 is output to the adder of a general pixel 10. On the other hand, when the input signal is not retained in the register 38, the output of the light receiving element 14 is output to the adder of the ambient light pixel 10. In the present embodiment, the adder 13 or 26 corresponds to an output unit that outputs a signal based on an electrical signal output by each of light receiving elements selected by a selector in response to reception of measurement light.

As described above, in the photodetector 1 according to the present embodiment, the selector 18, 20, 24, 32, 34, or 36 selects the light receiving element 14 to be used for measurement from a plurality of light receiving elements 14 having different light receiving regions. In this way, it is possible to arrange the incidence region of the measurement light so as to be superimposed on and coincide with the light receiving region to be used for measurement by the photodetector 1. As a result, it is possible to detect measurement light even under ambient light entering the light receiving region to be used for measurement by the photodetector 1.

Moreover, the setting unit 22, 30, or 38 changes the setting of the light receiving element 14 to be used for measurement from the plurality of light receiving elements 14. In this way, even when an incidence position of the measurement light changes, it is possible to arrange the incidence region of the measurement light so as to be superimposed on and coincide with the light receiving region to be used for measurement by the photodetector 1.

Modification

A configuration example of a pixel 10 in which light receiving regions are arranged in a matrix configuration the light and receiving element 14 is selected using a logical circuit will be described with reference to FIG. 7.

Figure 7:
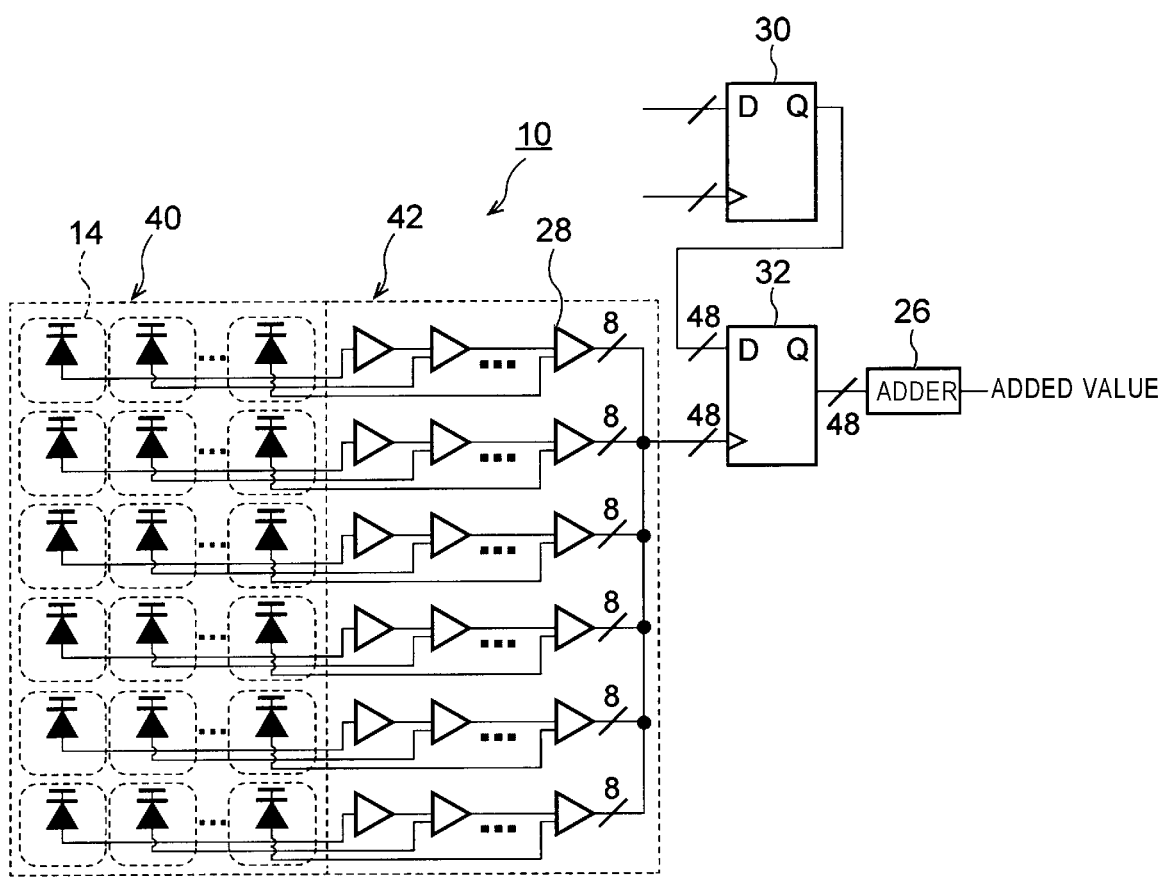
FIG. 7 illustrates a configuration of a pixel in which a plurality of light receiving elements is arranged in a matrix configuration.

FIG. 7 illustrates a configuration of the pixel 10 in which a plurality of light receiving elements 14 is arranged in a matrix configuration. The light receiving regions illustrated in FIG. 1A are arranged in parallel whereas the light receiving regions illustrated in FIG. 7 are arranged in a matrix configuration.

The pixel 10 includes a load sensing pressure 40, a front-end portion 42, a selector (D flip-flop) 32, and an adder 26. The load sensing pressure 40 includes a plurality of light receiving elements 14 having different light receiving regions. In this example, eight light receiving elements 14 are arranged in one row. Also, in this example, a resistor (not illustrated) is connected in series to the light receiving element 14.

The front-end portion 42 has a buffer 28 corresponding to each of the plurality of light receiving elements 14. That is, forty-eight light receiving elements 14 and forty-eight buffers 28 are in one-to-one correspondence.

One end of the buffer 28 is connected to an end of the light receiving element 14, and the other end is connected to the D flip-flop 32. As a result, each buffer 28 can shape an electrical signal corresponding to the output of the corresponding light receiving element 14 and outputs the shaped electrical signal as a digital signal. Here, the electrical signal is a voltage, for example. Moreover, the output of eight light receiving elements 14 for one row is output in a manner of being multiplexed into eight pieces.

One end of the D flip-flop 32 is connected to the buffer 28 and the other end is connected to the adder 26. The D flip-flop 32 is multiplexed into 48 units so that forty-eight D flip-flops 32 and forty-eight buffers 28 are in one-to-one correspondence.

The adder 26 adds the outputs of the multiplexed forty-eight D flip-flops 32. As can be understood, when a photon simultaneously enters a plurality of light receiving elements 14, the digital signals corresponding to the electrical signals output by the plurality of light receiving elements 14 are added and output from the pixel 10 as an addition value. Based on this addition value, it is possible to detect the number of photons entering the light receiving region of the pixel 10 (that is, the light receiving region of the photodetector 1).

Second Embodiment

A photodetector according to a second embodiment arranges rectangular cells at the ends of a pixel so that the end of the pixel can be used for detecting a measurement light.

A light receiving region of a light receiving element 14 when measurement light of which width in one direction is narrower than the width in the other direction is used will be described based on FIGS. 8 to 12. This light receiving region is an example of a light receiving region of the light receiving element 14 illustrated in FIGS. 2 to 7.

As described above, in order to suppress reception of ambient light, which can be a noise, as much as possible, it is necessary to narrow a viewing angle in one direction of the incidence region of the pixel 10. In this case, high-accuracy adjustment is required in one direction in which the viewing angle is narrowed. Here, the viewing angle represents the range of an incidence region of the pixel 10 by the angle of a light receiving optical system. A cell is selected so that an entire light receiving region thereof coincides with the incidence region as much as possible.

Figure 8:
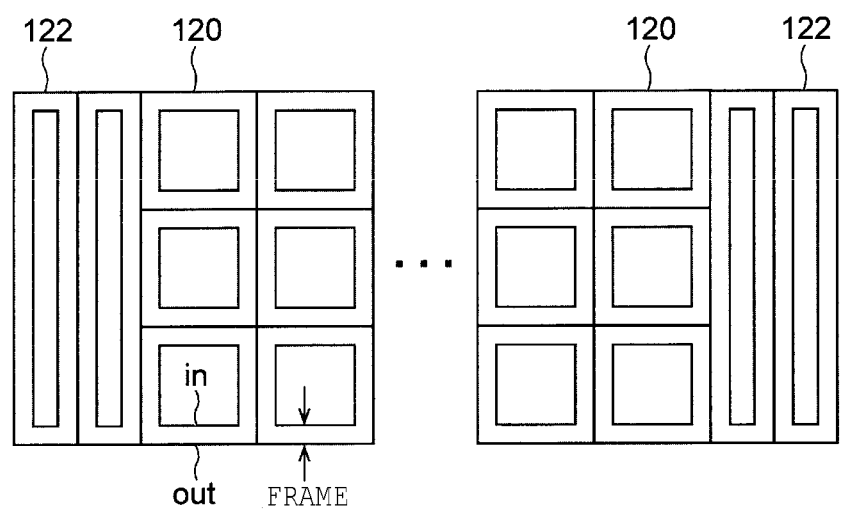
FIG. 8 illustrates an arrangement of light receiving regions when measurement light of which width in a horizontal direction is narrower than the width in a vertical direction is used.

A light receiving region of the light receiving element 14 when measurement light of which width in one direction is narrowed is used will be with reference to FIGS. 8 to 12. FIG. 8 illustrates an arrangement of light receiving regions when measurement light of which width in a horizontal direction is narrower than the width in a vertical direction is used. Here, an outer rectangle "out" of each rectangular region indicates the range of one cell 12. An inner rectangle "in" indicates a light receiving region of the cell 12 (that is, the light receiving region of the light receiving element 14 having this cell).

Moreover, in FIGS. 8 to 12, a square cell is denoted by 120 and a rectangular cell is denoted by 122. In this example, some square cells and some rectangular cells are denoted by reference numerals.

For example, when the region of the pixel 10 having a width of 150 μm at the center of FIG. 8 is formed as a square cell 120 of which one side is 30 μm, five cells 12 are arranged horizontally. Moreover, when one cell of the square cell 120 is 25 μm, six cells are arranged horizontally.

Here, the entire region of the cell indicated by a rectangle "out" does not function as a light receiving region, but a region indicated by a rectangle "in" functions as a light receiving region of a cell. The area ratio between the outer rectangle "out" and the inner rectangles "in" is referred to as an aperture ratio. Similarly, when a square cell and a rectangular cell have the same area, the aperture ratio of the square cell is higher than that of the rectangular cell.

When measurement light which is narrowed in a horizontal direction is used, the viewing angle of the entire light receiving region of a cell is adjusted to fit with the measurement light such that the viewing angle in the horizontal direction is narrower than the viewing angle in the vertical direction. In this case, when an isotropic light receiving optical system or a light receiving optical system having a weak anisotropic property is used, the length of the incidence region in a vertical direction is larger than the length in a horizontal direction. In general, when an isotropic optical system or an optical system having a strong anisotropic property is used, the cost or the size increases. For that reason, in general, the length of the incidence region in a vertical direction is larger than that in the horizontal direction. In order to adjust the entire light receiving region so as to coincide with the incidence region more accurately, a light receiving region which is narrower in a horizontal direction as indicated by 122 in FIG. 8 is preferable. Furthermore, when a light receiving region is formed in a vertically long rectangular form, the area of an aperture can be maintained to be equal to that of a square cell.

The areas of the apertures of the respective cells (that is, the areas of the light receiving regions of the cells) are preferably equalized. When the areas are equalized, since the output of the pixel 10 (that is, the output of the adder) is proportional to the number of photons received (that is, the amount of irradiated light) when the amount of received light is small), the pixel can be used as a sensor. When the areas are not equalized, since the output of the pixel is not proportional to the amount of irradiated light, the pixel cannot be used as a sensor.

In general, it is expected that the incidence region is positioned approximately at the center of the pixel 10, and a cell positioned at the center is often selected. On the other hand, cells positioned in the left and right end regions of the pixel 10 are selected or not depending on an installed state of an optical system in an individual product. Therefore, a square cell 120 having a high aperture ratio is disposed at the center and the rectangular cells 122 which can be adjusted more accurately are disposed in the end regions.

Moreover, in some cases, it is difficult to secure a width in which the square cell 120 is disposed at the end portion of the pixel 10. In this case, in order to effectively use the end region of the pixel 10, it is preferable to form the light receiving region of the cell in the end region in a rectangular form.

In general, in order to equalize the areas of the square cell 120 and the rectangular cell 122, an equation $Z=(2XY-4X+1)/(Y-2X)$ may be calculated. Here, Z indicates the ratio of a horizontal width of the rectangular cell 122 to the width of one side of the square cell 120, X indicates the ratio of the width of a frame to the width of one side of the square cell 120, and Y indicates the ratio of the width of a vertical width of the rectangular cell 122 to the width of one side of the square cell 120. Here, Y is preferably an integer.

This is obtained by solving an equation $(1-2X)(1-2X)=(Y-2X)(Z-2X)$ for the ratio Z of the horizontal width of the rectangular cell 122. The left side represents the light receiving region of the square cell 120. Moreover, the right side represents a light receiving region of a rectangular cell 122 of which vertical length is Y times that of the square cell 120 and the width is Z times that of the square cell 120. For example, when the ratio X of the width of the frame to the width of one side of the square cell 120 is ⅙, if the ratio Y of the vertical width of the rectangular cell 122 to the width of one side of the square cell 120 is 3, and the ratio Z of the horizontal width of the rectangular cell 122 to the width of one side of the square cell 120 is ½, the aperture ratios of both cells are equal. In this case, the aspect ratio of the rectangular cell 122 is 6.

Moreover, for example, when the ratio X of the width of the frame is 0.1 and the ratio Y of the vertical width is 2, the ratio Z of the horizontal width is $1/1.8 \cong 0.56$. In this case, the aspect ratio is 3.6.

Furthermore, when the ratio X of the width of the frame is 0.3 and the ratio Y of the vertical width is 2, the ratio Z of the horizontal width is $1/1.4 \cong 0.71$. In this case, the aspect ratio is 2.8.

FIG. 9 illustrates an aspect ratio table of the rectangular cell 122. In this table, the column at the left end indicates the ratio X of the width of a frame and the row at the upper end indicates the ratio Y of a vertical width. As illustrated in FIG. 9, the aspect ratio is calculated by the equation $(Y-2X)Y/(2XY-4X+1)$, and an aspect ratio is 2 or more if $0 \leq X \leq 0.5$ and $Y \geq 2$ (integer). As described above, the area of the light receiving region of each cell 12 and the output of the light receiving element 14 are statistically proportional to the irradiation intensity of light. Due to this, in the present embodiment, the areas of the light receiving regions of the respective cells 12 are equalized.

When it is desired to further extend an adjustment width of the position in one direction, all cells may be configured as the rectangular cell 122. Alternatively, the proportion of the rectangular cell 122 may be increased. Moreover, for example, it may be desirable to adjust the position of the square cell 120 by 10 μm when the width of one side of the square cell 120 is 20 μm, for example. In such a case, the accuracy of the position adjustment may be increased using the rectangular cell 122 of which width of one side is 10 μm, for example, as an adjustment cell.

Figure 10:
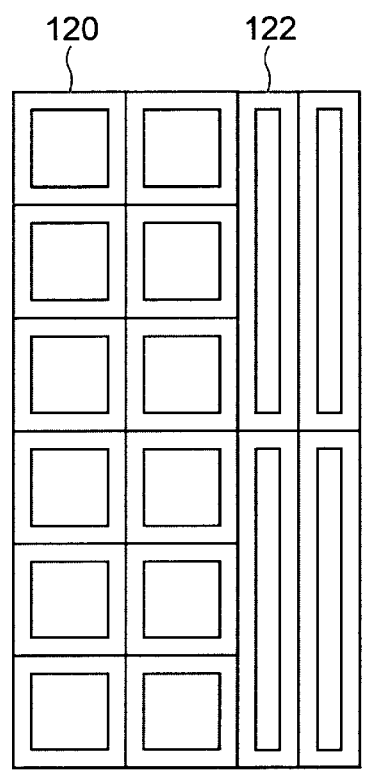
FIG. 10 illustrates an example in which rectangular cells are arranged at a right end.

FIG. 10 illustrates an example in which the rectangular cell 122 is arranged at the right end. For example, when the area of the end portion is small, the rectangular cell 122 may be arranged at one end only. Although the rectangular cells 122 are arranged in two columns in FIG. 10, the rectangular cells 122 may be arranged in one column.

Figure 11:
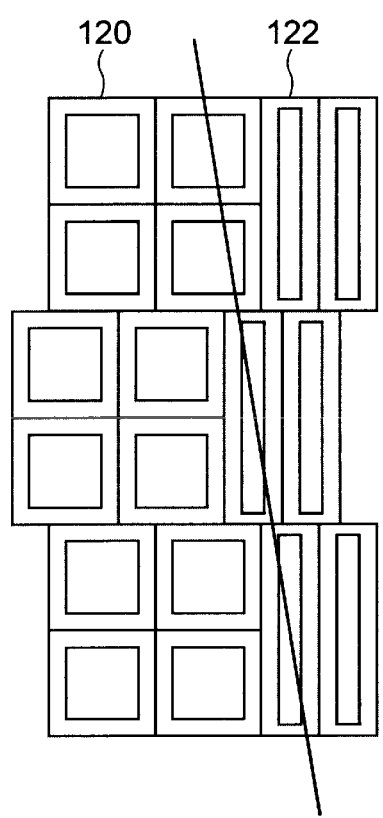
FIG. 11 illustrates an example in which rectangular cells are arranged in a staggered form.

FIG. 11 illustrates an example in which rectangular cells 122 are arranged in a staggered form. For example, when measurement light is irradiated obliquely, the rectangular cells 122 are arranged in a staggered form. In this way, the adjustment can be performed with high accuracy.

Figure 12:
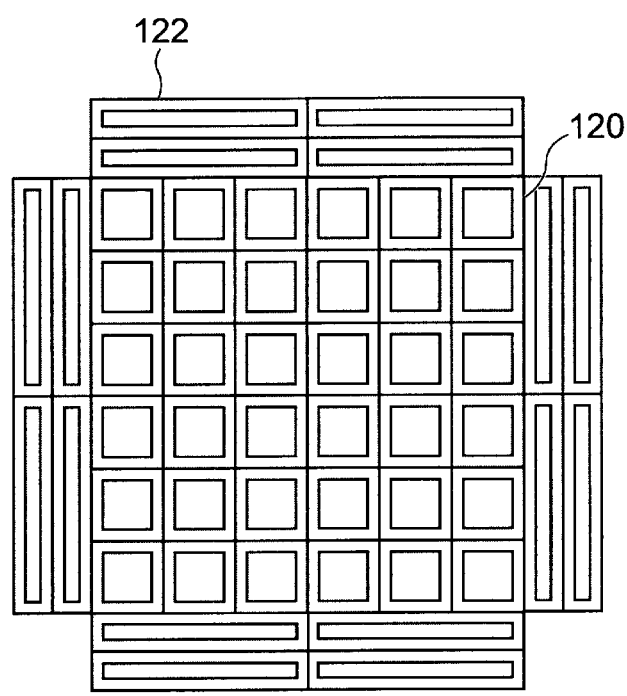
FIG. 12 illustrates an example in which rectangular cells are arranged at left and right ends and upper and lower ends.

FIG. 12 illustrates an example in which rectangular cells 122 are arranged at the left and right ends and the upper and lower ends. With this arrangement, it is possible to measure measurement light of which widths in both the horizontal direction and the vertical direction are narrowed or two types of measurement light. In the latter case, it is possible to measure both measurement light of which width in the horizontal direction is narrower than the width in the vertical direction and measurement light of which width in the vertical direction is narrower than the width in the horizontal direction.

As described above, the photodetector 1 according to the present embodiment arranges the rectangular cells 122 at the end of the pixel 10. In this way, it is possible to adjust the entire light receiving region to coincide with the incidence region with higher accuracy. Moreover, it is possible to equalize the areas of the apertures of respective cells (that is, the areas of the light receiving regions of the cells) and to sense the irradiation amount of light.

Third Embodiment

A distance measuring device according to a third embodiment automatically selects a light receiving element to be used for outputting a signal to a pixel based on measurement light irradiated to a light receiving region of a photodetector.

A distance measuring device 100 capable of selecting a light receiving element 14 to be used for measurement will be described with reference to FIG. 13. FIG. 13 illustrates a configuration of the distance measuring device 100 when analog addition is performed. As illustrated in FIG. 13, the distance measuring device 100 includes a pixel 10 and a determination unit 48. Here, the pixel 10 is an example of the pixel 10 described in FIG. 4, for example. The same elements as those of the elements illustrated in FIG. 4 will be denoted by the same reference numerals and the description thereof will not be provided.

Returning again to FIG. 13, the pixel 10 includes a setting unit 22, a plurality of cells 50, and an adder 13. Each cell 50 includes a selector 24 and a light receiving unit 52. The light receiving unit 52 includes a light receiving element 14 illustrated in FIG. 4 and a resistor 16. Returning again to FIG. 13, the determination unit 48 determines the relation of the magnitudes of the electrical signals output from the adder 13 and selects the cell 50 (that is, the light receiving element 14) to be used for outputting a signal to the pixel 10.

Here, a serial number indicating the order of a setting process is set in advance for the plurality of cells 50. The range of measurement light on the light receiving region of the pixel 10 is continuous. For that reason, the number of the cell 50 is set so that the range of measurement light is continuous. For example, the number may be assigned from right to left so that the cell 50 positioned on the rightmost side is cell 1 and the cell located to the left side is cell 2.

Next, an example of a setting process will be described. In this example, it is assumed that M ($M \leq N$) cells 50 are selected from N cells 50 in a state in which measurement light for setting is irradiated in a darkroom.

First, the setting unit 22 receives a setting process start signal from the determination unit 48 and outputs a signal indicating selection to the selectors 24 of the cells 50 of the numbers 1 to M. Moreover, the determination unit 48 stores 0 as an initial value of a determination value. Subsequently, measurement light is irradiated and the adder 13 adds the outputs of the selected cells 50. Further, subsequently, the determination unit 48 outputs 1 when the output value of the adder 13 is larger than a determination value and outputs 0 otherwise. Moreover, when the output value of the adder 13 is larger than a determination value, the determination unit 48 replaces the determination value with the output value of the adder 13 and stores the serial number of the cell 50 at that time.

Subsequently, the setting unit 22 outputs a signal indicating selection to the selectors 24 of the cells 50 of the numbers 2 to M+1 according to an instruction of the determination unit 48. Subsequently, measurement light is irradiated under the same conditions and the adder 13 adds the output of the selected cells 50. As described above, the determination unit 48 outputs 1 when the output value of the adder 13 is larger than the determination value and outputs 0 otherwise. Moreover, when the output value of the adder 13 is larger than the determination value, the determination unit 48 replaces the determination value with the output value of the adder 13.

Such a process is repeated until the number of the cell 50 changes from N–M+1 to N. Finally, cells 50 (the cells 50 from (serial number) to ((serial number)+(M–1)) corresponding to the serial number of the cell 50 stored in the determination unit 48 are used during measurement.

As can be understood, M cells 50 in which the output value of the addition values has the maximum value are selected. In this case, since the serial number of the cell 50 is set by taking the continuity of the cells 50 into consideration, it is possible to set a continuous light receiving region.

FIG. 14 illustrates a configuration of the distance measuring device 100 when digital addition is performed. Here, the pixel 10 is an example of the pixel 10 described in FIG. 5, for example. In this example, each light receiving unit 56 includes the light receiving element 14, the resistor 16, and the buffer 28 illustrated in FIG. 5. The same elements as those of the elements illustrated in FIG. 5 will be denoted by the same reference numerals and the description thereof will not be provided.

Returning again to FIG. 14, the determination unit 48 determines the relation of the magnitudes of the electrical signals output from the adder 26 and selects the cell 54 to be used for outputting a signal to the pixel 10. Since this process is the same as the process described in FIG. 13, the description will not be provided.

As described above, in the distance measuring device 100 according to the present embodiment, the determination unit 48 determines the relation of the magnitudes of the addition values of different combinations of M cells 50 and 54, and selects a combination of cells 50 and 54 having the maximum value. In this way, it is possible to adjust the light receiving region to be used for measurement of measurement light in the photodetector 1 so as to coincide with the incidence region of the measurement light reflected from a target object with high accuracy.

Fourth Embodiment

In the present embodiment, a light receiving element of a cell positioned at the center of a half-value width or a 1/e2-value width based on the output value of each cell of a photodetector is selected as a light receiving element to be used for outputting a signal to a pixel.

Since the elements are the same as the elements of FIG. 13, the description of the configuration will not be provided. In this example, a case in which the width in the horizontal direction of the measurement light is narrower than the width in the vertical direction will be described with reference to FIG. 13 and FIGS. 15A to 15C.

Figure 15A:
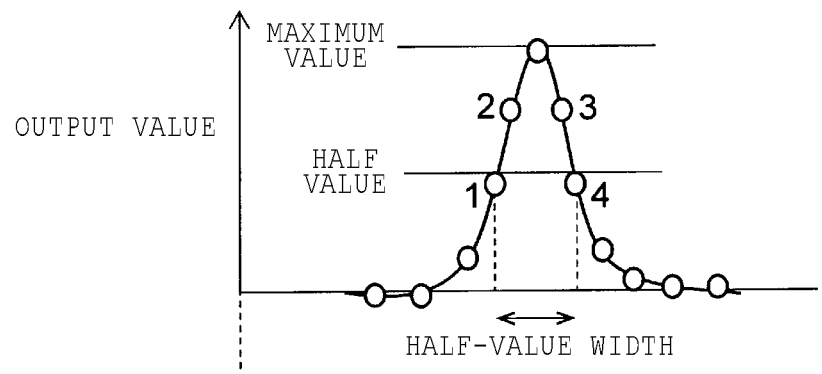
FIGS. 15A to 15C each illustrate relation between a cell position and an output value.
Figure 15B:
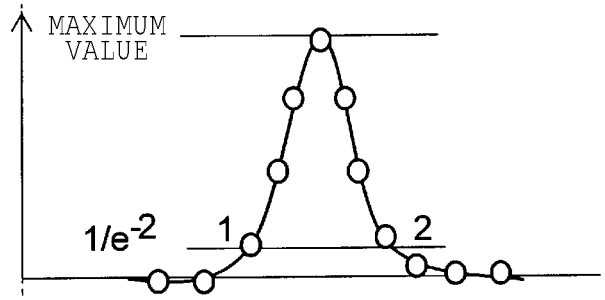
Figure 15C:
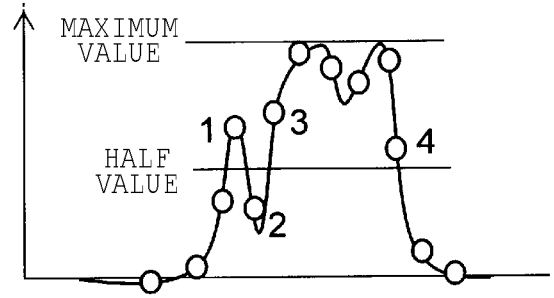

FIGS. 15A to 15C illustrate the relation between the position and the output value of the pixel 50. The horizontal axis represents the serial number of the cell 50, and the vertical axis represents the output value of the addition value corresponding to the serial number (the addition value of the output values of the cells 50 from (serial number) to ((serial number)+(M–1)) is illustrated). FIG. 15A illustrates a half-value width and the cell 50 at the center of the half-value width. FIG. 15B illustrates a 1/e2-value width and the cell 50 at the center of the 1/e2-value width. FIG. 15C illustrates an example of processing results when the state of measurement light is poorer than that of FIG. 15A.

First, a flow of a process of selecting a light receiving element of the cell 50 at the center of a half-value width will be described with reference to FIG. 13 and FIG. 15A. In this example, the cell 50 to be used for outputting a signal to the pixel 10 is selected from cells 50.

In the present embodiment, the determination unit 48 has two operation modes. In a first operation mode, similarly to the third embodiment, the determination unit 48 stores 0 as an initial value of the determination value. Furthermore, similarly to the third embodiment, the determination unit 48 outputs 1 when the output value of the adder 13 is larger than a determination value and outputs 0 otherwise. Moreover, when the output value of the adder 13 is larger than a determination value, the determination unit 48 replaces the determination value with the output value of the adder 13 and stores the serial number of the cell 50 at that time. In a second operation mode, a value half a previous value is stored as an initial value of the determination value. Furthermore, the determination unit 48 outputs 1 when the output value of the adder 13 is larger than the determination value and outputs 0 otherwise. However, when the output value of the adder 13 is larger than the determination value, the determination value is not changed unlike the first mode. Moreover, the serial number of the cell 50 when 1 is first output and the serial number of the cell when 1 is output lastly are stored. The former is referred to as a first serial number and the latter is referred to as a second serial number.

First, the determination unit 48 sets the operation mode to a first mode and performs a setting process similarly to the first embodiment. In this case, similarly to the third embodiment, a combination of cells 50 in which the addition value has the maximum value is selected, and the maximum value is stored in the determination value. Subsequently, the determination unit 48 sets the operation mode to a second mode and performs a setting process. In this case, first, a value half a previous maximum value (that is, a half value) is stored as an initial value of the determination value, and the determination value is not changed during the setting process. After the setting process is performed, a serial number (a horizontal-axis value (N1) of a point 2 in FIG. 15A) when the addition value first exceeds the half value) and a serial number (a horizontal-axis value (N2) of a point 3 in FIG. 15A) when the addition value lastly exceeds the half value) are stored in a first serial number and a second serial number. Finally, an arithmetic mean (for example, a round-down value of (N1+N2)/2) of the first and second serial numbers is calculated, and the cells 50 of the serial number and (the serial number)+(M−1) are selected. This selection corresponds to so-called the full width at half maximum.

When the cells 50 are selected using the half-value width, even when the distance between the measurement light and the light receiving region of the pixel 10 is shifted from the focal point of a measurement system and the measurement light blurs, a decrease in the selection accuracy of the cell 50 can be prevented. For example, in FIG. 15C, due to the blur, high peaks are flat and the light is not clear. In the third embodiment, there is a possibility that a cell having the maximum value is selected and located on the right side of the high peak. In the present embodiment, a cell corresponding to approximately the center of a high peak is selected.

(Modification)

Next, a flow of a process of selecting the cell 50 at the center of the 1/e2-value width will be described with reference to FIG. 13 and FIG. 15B. As illustrated in FIG. 15B, the 1/e2-value width of the output values of the cells 50 is calculated and a cell 50 at the center of the 1/e2-value width is selected.

In the preceding embodiments, in the second operation mode, a value half the previous value is stored as the initial value of the determination value. In this modification, in the second operation mode, a 1/e2 value of the previous value is stored as the initial value of the determination value.

More specifically, first, the operation mode of the determination unit 48 is set to a first mode, and a setting process is performed similarly to the third embodiment. In this case, in the third embodiment, a combination of cells 50 of which addition value has a maximum value is selected, and this maximum value is stored in the determination value. Subsequently, the operation mode of the determination unit 48 is set to a second mode and a setting process is performed. In this case, first, a value which is 1/e2 of a previous maximum value (that is, a 1/e2 value) is stored as an initial value of the determination value, and the determination value is not changed during the setting process. After the setting process is performed, a serial number (a horizontal-axis value (N1) of a point 2 in FIG. 15A) when the addition value first exceeds the 1/e2 value) and a serial number (a horizontal-axis value (N2) of a point 3 in FIG. 15A) when the addition value lastly exceeds the 1/e2 value) are stored in a first serial number and a second serial number. Finally, an arithmetic mean (for example, a round-down value of (N1+N2)/2) of the first and second serial numbers is calculated, and the cells 50 of the serial number and (the serial number)+(M−1) are selected.

For example, in FIG. 15C, due to the blur, high peaks are flat and the light is not clear. In the third embodiment, there is a possibility that a cell having the maximum value is selected and located on the right side of the high peak. In the present embodiment, a cell corresponding to approximately the center of a high peak is selected.

As described above, in the distance measuring device 100 according to the present embodiment, the determination unit 48 selects a cell 50 positioned at the center of the half-value width or the 1/e2-value width based on the output values of the cells 50 of the photodetector 1 for each row. In this way, it is possible to select the cell 50 (that is, the light receiving element 14) positioned approximately at the center of an incidence region of the measurement light reflected from a target object. Moreover, even when the measurement light blurs, a decrease in the selection accuracy of the cell 50 is prevented.

Fifth Embodiment

The present embodiment is different from the third embodiment in that the number of selected light receiving elements is variable. Hereinafter, a difference from the third embodiment will be described. Since the elements are the same as those of FIG. 13, the description of the configuration will not be provided.

The determination unit 48 performs the same process as the third embodiment while changing the number of selected cells 50 (that is, the selected light receiving elements 14) from 1 to N. In this case, an average light reception amount obtained by dividing the addition value obtained by the adder 13 by the number of selected cells 50 is used as the determination value instead of the maximum value. In this way, the cells 50 are selected so that the average light reception amount per each cell 50 increases.

In this method, a combination of cells having a higher S/N ratio is obtained when ambient light, which is a noise, is uniformly received in addition to signals. That is, it is possible to select the cells 50 so that an ambient light resistance property is improved. When a lower limit of the number of selected cells 50 is not provided, since cells 50 located near the maximum value are selected in a concentrated manner, the lower limit of the number of selected cells 50 may be determined in advance.

Moreover, when the ambient light is little, the S/N ratio can be improved further by increasing the lower limit of the number of selected cells 50. Therefore, in this case, the number of selected cells 50 may be increased by a predetermined number than when ambient light is received uniformly. Alternatively, the cells 50 may be selected so that the number of selected cells 50 is increased until the sum of light reception amounts saturates.

As described above, in the present embodiment, the number of cells 50 (that is, the light receiving elements 14) selected by the determination unit 48 is variable. In this way, it is possible to select a combination of cells 50 (that is, the light receiving elements 14) so that the average light reception amount increases.

Sixth Embodiment

In a sixth embodiment, cells (that is, light receiving elements) divided into a light receiving region on the left side of a pixel and a light receiving region on the right side are selected in parallel to improve a processing speed. Hereinafter, a difference from the third embodiment will be described.

Figure 16:
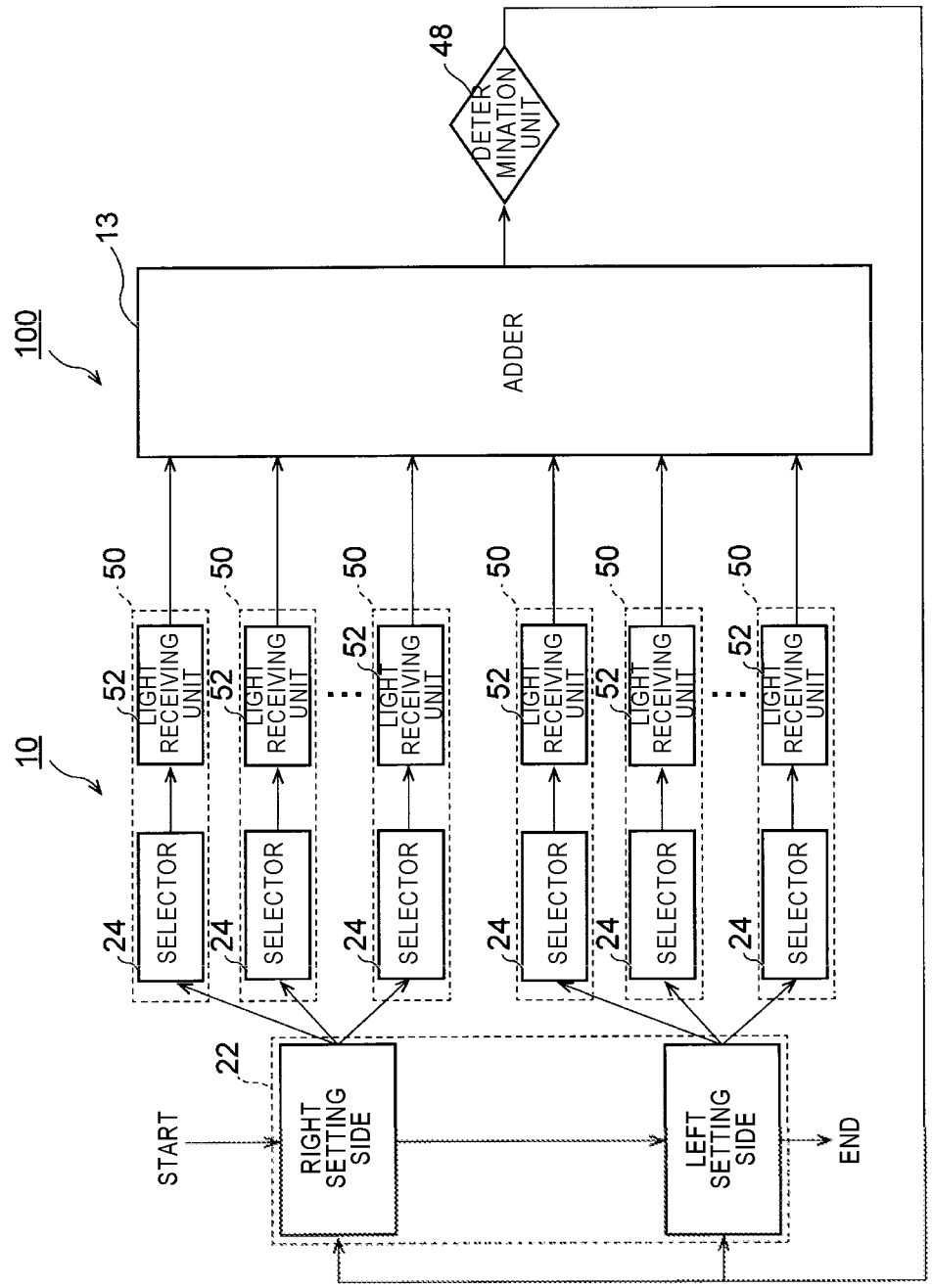
FIG. 16 illustrates a configuration of a distance measuring device according to a sixth embodiment when analog addition is performed.

A case in which cells 50 divided into a light receiving region on the left side of a pixel 10 and a light receiving region on the right side are selected will be described with reference to FIG. 16. FIG. 16 illustrates a configuration of a distance measuring device 100 according to the sixth embodiment when analog addition is performed. As illustrated in FIG. 16, the present embodiment is different from the third embodiment in that the setting unit 22 selects cells 50 (that is, light receiving elements 14) divided into the light receiving region on the left side of the pixel 10 and a light receiving region on the right side.

When the number of cells 50 is fixed, the setting unit shifts the selection in one direction (rightward or leftward) synchronously in the left and right-side regions. For example, when the selection is shifted rightward, cells 50 are sequentially selected from the cell 50 at the left end in the light receiving region on the left side whereas cells 50 are sequentially selected from the cell 50 at the center in the light receiving region on the right side.

On the other hand, when the number of cells 50 is variable, the order of cells selected in the right-side region is opposite to the order of cells selected in the left-side region. In this way, the output changes in one of the increasing and decreasing directions and the determination performance can be improved.

Figure 17:
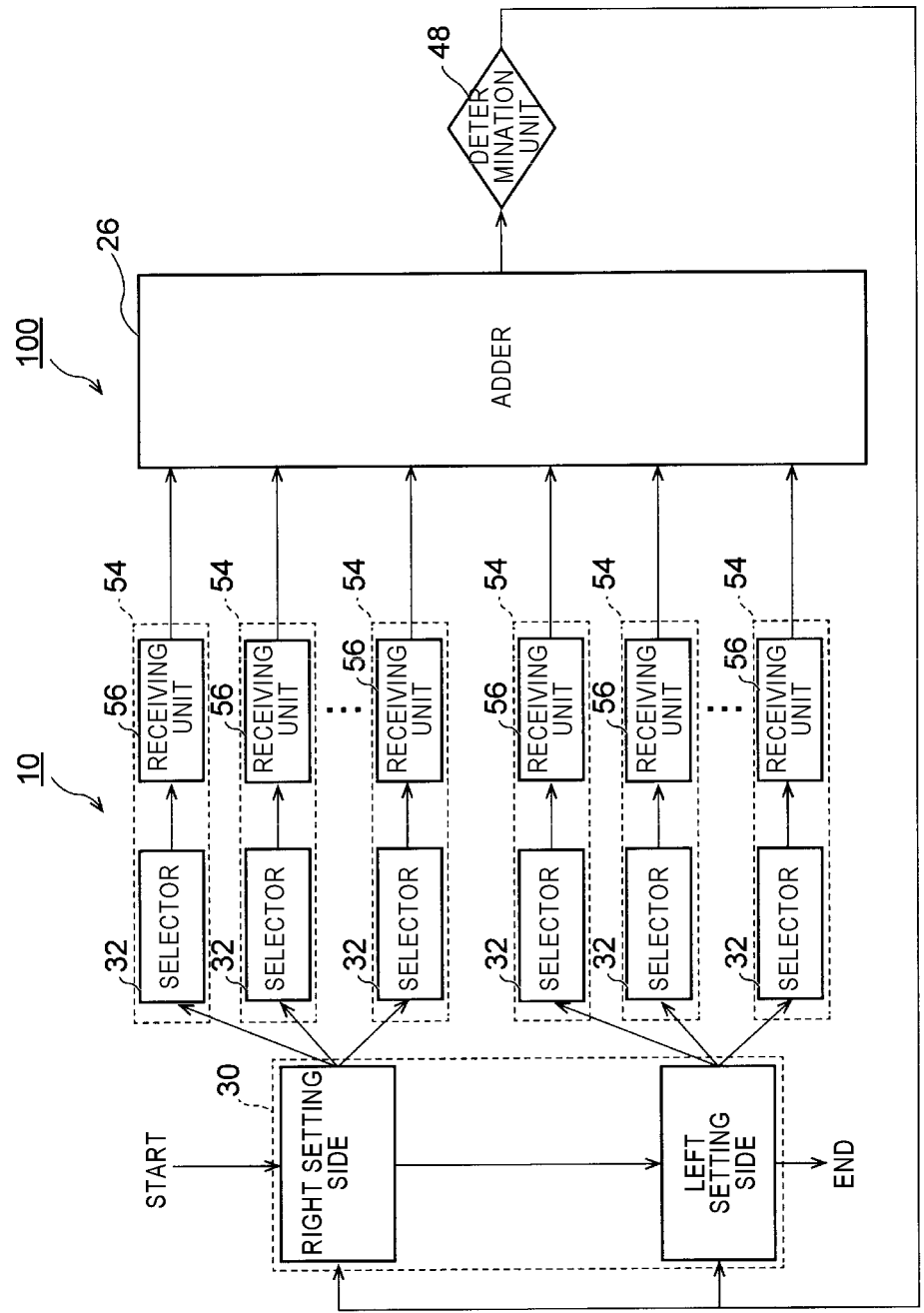
FIG. 17 illustrates a configuration of a distance measuring device according to the sixth embodiment when digital addition is performed.

FIG. 17 illustrates a configuration of the distance measuring device 100 according to the sixth embodiment when digital addition is performed. In FIG. 17, since the same process as FIG. 16 is performed, the description of the process will not be provided.

As described above, in the present embodiment, cells 50 and 43 divided into the light receiving region on the left side of the pixel 10 and the light receiving region on the right side are selected. As a result, it is possible to increase the processing speed.

Seventh Embodiment

In the present embodiment, measurement light for setting is irradiated from a projector a plurality of number of times to further improve the selection accuracy of cells (that is, light receiving elements).

Figure 18:
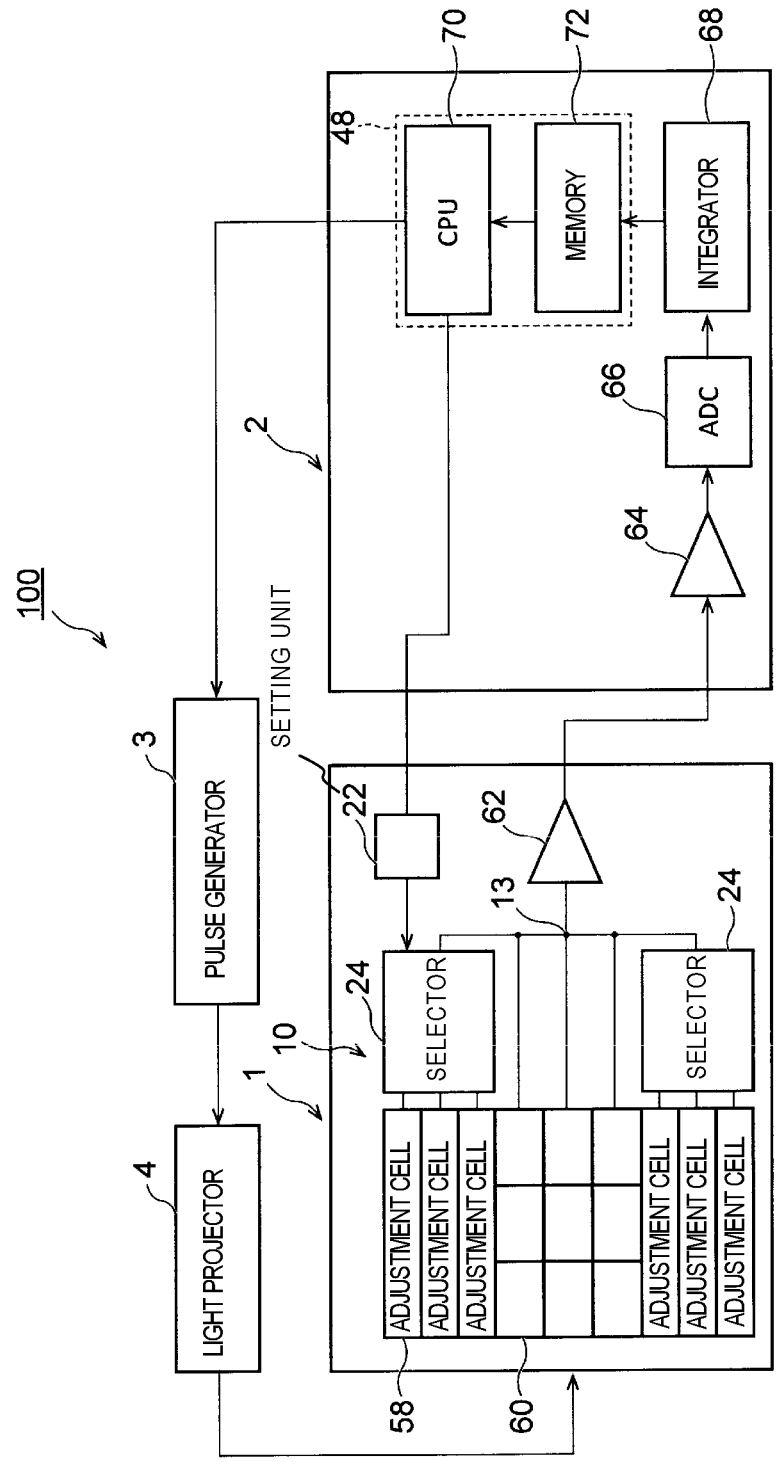
FIG. 18 illustrates a configuration of a distance measuring device according to a seventh embodiment.

How adjustment cells 58 are selected when measurement light is irradiated a plurality of number of times will be described with reference to FIG. 18. FIG. 18 illustrates a configuration of a distance measuring device 100 according to a seventh embodiment. As illustrated in FIG. 18, the distance measuring device 100 according to the seventh embodiment includes a photodetector 1, a measurement circuit 2, a pulse transmitter 3, and a projector 4.

The photodetector 1 outputs a signal corresponding to measurement light. That is, the photodetector 1 includes pixels 10 and an amplification unit 62. The pixel 10 includes an adder 13, a setting unit 22, a selector 24, a plurality of adjustment cells 58, and a plurality of fixed cells 60. The photodetector 1 illustrated in FIG. 13 is different from the photodetector 1 illustrated in FIG. 13 in that the pixel 10 includes the plurality of fixed cells 60 and the amplification unit 62. The same elements as those of the photodetector 1 illustrated in FIG. 12 will be denoted by the same reference numerals and the description thereof will not be provided.

The adjustment cells 58 are cells that are selected and used during measurement. That is, cells (that is, light receiving elements) to be used during measurement are selected from these adjustment cells 58.

The fixed cells 60 are cells which have been selected for measurement. These fixed cells 60 are always used for measurement.

The adder 13 analog-adds the output currents of the selected adjustment cells 58 and the analog output currents of the fixed cells 60. The amplification unit 62 amplifies the output of the adder 13.

The measurement circuit 2 controls the pulse transmitter 3 which emits light a plurality of number of times for one measurement and selects cells to be used for measurement from the adjustment cells 58. More specifically, the measurement circuit 2 includes a determination unit 48, an amplification unit 64, an analog-to-digital converter (ADC) 66, and an integrator 68.

The determination unit 48 determines the relation of the magnitudes of the signal values output from the integrator 68 and selects cells to be used for outputting a signal to the pixel 10 from the adjustment cells 58. This determination unit 48 includes a CPU 70 and a memory 72.

The amplification unit 64 amplifies an electrical signal input from the photodetector 1. The analog-to-digital converter 66 converts the output signal of the amplification unit 64 to a digital value. The integrator 68 adds the digital values analog-to-digital converter (66) outputs which correspond to the responses to light projections in a plurality of number of times.

The pulse transmitter 3 outputs a pulse to the projector 4 according to the control of the determination unit 48. The projector 4 outputs laser light according to the input from the pulse transmitter 3.

The CPU 70, or a hardware controller, calculates a distance from the distance measuring device 100 to an object based on timing when the measurement light is emitted from the projector and timing when the measurement light is incident on the pixel 10.

Next, an example of an operation of selecting the adjustment cell 58 will be described. In this example, a case in which M (M≤N) cells 58 are selected from N cells 58 in a state in which measurement light for setting is irradiated in a darkroom will be described.

In the third embodiment, measurement light is irradiated once to M selection target cells 50. In contrast, in the present embodiment, measurement light is irradiated a plurality of number of times to the M selection target cells 58. That is, output signals of a plurality of number of irradiations are integrated which is different from the third embodiment.

More specifically, first, the setting unit 22 outputs a signal indicating selection to the selectors 30 of the numbers 1 to M of the adjustment cells 58. When the selector 24 selects a new adjustment cell 58, the integrator 68 sets the integrated value to 0.

Subsequently, the adder 13 adds the electrical signals output by the selected adjustment cells 58 and the fixed cells 60 according to irradiation of the measurement light. Further, subsequently, the integrator 68 integrates the digital signals which have been amplified by the amplification unit 64 and converted to digital signals by the analog-to-digital converter 66. Such irradiation and processing on the measurement light is performed J times. J is a predetermined integer of 2 or more. That is, the integrator 68 integrates digital signals corresponding to the output signals of the cells 12 of the numbers 1 to M J times. Moreover, the determination unit 48 stores the integrated value of the integrator 68 when J times of measurement end and the serial numbers of the selected adjustment cells 58 in correlation.

Subsequently, the selector 24 performs the same selection process as described above while changing the number of the adjustment cell 58 from 2 to M+1 using the register 22. Such a process is repeated until the number of the adjustment cell 58 changes from N−M+1 to N. Moreover, the determination unit 48 selects the maximum value from the stored integrated values and uses a cell corresponding to the serial number of the adjustment cell 58 correlated with the maximum value during measurement. In the present embodiment, by integrating or averaging the measurement results J times, it is possible to reduce the influence of noise and to further improve the selection accuracy of the adjustment cell 58.

As described above, in the distance measuring device 100 according to the present embodiment, the determination unit 48 determines the relation of the magnitudes of the integrated values obtained by irradiating measurement light J times to a different combination of M adjustment cells 58 and selects a combination of adjustment cells 58 in which the integrated value has the maximum value. In this way, it is possible to reduce the influence of noise and to adjust the positional relation between the light receiving region to be used for measurement of the measurement light in the photodetector 1 and the incidence region of the measurement light reflected from the target object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A photodetector comprising:
    a plurality of cells each configured to detect light and including:
        a photodiode having anode and cathode terminals and configured to output an electrical signal upon receipt of the light,
        a resistor having first and second terminals, the first terminal being connected to the anode terminal of the photodiode, and
        first and second switches connected to the second terminal of the resister, wherein either the first switch or the second switch is turned on according to a selection signal;
    a first output terminal connected to the first switch of each of the cells and through which a first output signal is output based on the electrical signal that has been output from the first switch;
    a second output terminal connected to the second switch of each of the cells and through which a second output signal is output based on the electrical signal that has been output from the second switch;
    a first connection portion connected to the first switch of each of the cells; and
    a second connection portion connected to the second switch of each of the cells, wherein
    the second connection portion is electrically disconnected from the first connection portion.

2. The photodetector according to claim 1, further comprising:
    a setting circuit connected to the first and second switches of each of the cells and configured to output the selection signal to turn on either the first switch or the second switch of each of the cells.

3. The photodetector according to claim 1, wherein the electrical signal that has been output from the first switch of each of the cells is added in the first output signal, and the electrical signal that has been output from the second switch of each of the cells is added in the second output signal.

4. The photodetector according to claim 1, wherein
    each of the first and second switches is a transistor having first, second, and third terminals,
    the first terminal of each of the first and second switches is connected to the second terminal of the resistor,
    the selection signal is input to the second terminal of each of the first and second switches,
    the third terminal of the first switch is connected to the first output terminal,
    the third terminal of the second switch is connected to the second output terminal, and
    the first terminal of the first switch is connected to the first terminal of the second switch.

5. The photodetector according to claim 4, further comprising:
    a register having a first terminal connected to the second terminal of the first switch and a second terminal connected to the second terminal of the second switch, wherein
    the register is configured to output the selection signal to the second terminal of the first and second terminals.

6. The photodetector according to claim 1, wherein the selection signal turns on the first switches of one or more of the cells that are adjacent to each other and turns on the second switches of the other cells.

7. The photodetector according to claim 1, wherein
    each of the cells has a right receiving region extending along a first direction and by which the light is received, and
    the cells are arranged in line along a second direction crossing the first direction.

8. The photodetector according to claim 1, wherein the cells are arranged in a matrix in a plane.

9. The photodetector according to claim 1, wherein in response to a selection signal, either one of the first and second switches outputs the electrical signal that has been output from the photodiode via a corresponding one of the first and second connection portions.

10. The photodetector according to claim 1, wherein the second terminal of the resistor, the first switch, and the second switch are directly connected to each other.

11. The photodetector according to claim 1, wherein the first switch of one of the cells is connected to another cell via the first connection portion.

* * * * *